US010497049B2

(12) United States Patent
Ramamurthy et al.

(10) Patent No.: US 10,497,049 B2
(45) Date of Patent: Dec. 3, 2019

(54) OPTIMISTIC PRODUCT ORDER RESERVATION SYSTEM AND METHOD

(71) Applicant: Home Depot Product Authority, LLC, Atlanta, GA (US)

(72) Inventors: Hari Ramamurthy, Marietta, GA (US); Angie Brown, Atlanta, GA (US); Thomas Gamble, Atlanta, GA (US); Stephen Jacobs, Marietta, GA (US); Todd Stormes, Canton, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 837 days.

(21) Appl. No.: 15/062,075

(22) Filed: Mar. 5, 2016

(65) Prior Publication Data
US 2017/0255990 A1 Sep. 7, 2017

(51) Int. Cl.
G06Q 30/00 (2012.01)
G06Q 30/06 (2012.01)
G06Q 10/08 (2012.01)

(52) U.S. Cl.
CPC ....... G06Q 30/0635 (2013.01); G06Q 10/087 (2013.01)

(58) Field of Classification Search
CPC .................. G06Q 30/0635; G06Q 10/087
USPC ..................................... 705/26, 27
See application file for complete search history.

(56) References Cited

U.S. PATENT DOCUMENTS

| | | | |
|---|---|---|---|
| 7,904,975 B2 | 3/2011 | Kruglikov et al. | |
| 7,908,398 B2 | 3/2011 | Grow et al. | |
| 8,170,915 B2 | 5/2012 | Borders et al. | |
| 8,635,113 B2 | 1/2014 | Borders et al. | |
| 2002/0158751 A1* | 10/2002 | Bormaster | G06K 7/0008 340/10.2 |
| 2004/0143507 A1 | 7/2004 | Chen et al. | |
| 2004/0254843 A1* | 12/2004 | Koch | G06Q 10/087 705/26.81 |
| 2006/0015414 A1 | 1/2006 | Congram et al. | |
| 2009/0037283 A1* | 2/2009 | Anderson | G06Q 10/087 705/15 |

(Continued)

OTHER PUBLICATIONS

Mahar et al., "Enterprise Systems Focused Collection: DualChannel Supply Chains: Challenges and Opportunities in E-Fulfillment," Production and Inventory Management Journal 47.2: 14-30; Dialog #930687194, 19pgs. (Year: 2011).*

(Continued)

Primary Examiner — Robert M Pond
(74) Attorney, Agent, or Firm — Greenberg Traurig, LLP (57) ABSTRACT

Receiving and processing user orders may include receiving an order for an order quantity of a product from a user computing device, retrieving a threshold inventory quantity of the product, retrieving a last known inventory quantity of the product, comparing the threshold inventory quantity with the difference between the last known inventory quantity and the order quantity, performing an asynchronous reservation of the quantity of the product when the threshold inventory quantity is less than the difference between the last known inventory quantity and the order quantity, and performing a synchronous reservation of the quantity of the product when the threshold inventory quantity is greater than the difference between the last known inventory quantity and the order quantity.

20 Claims, 4 Drawing Sheets

(56) References Cited

U.S. PATENT DOCUMENTS

2012/0296769 A1    11/2012    Ginster, II et al.
2014/0229338 A1    8/2014    Borders et al.
2015/0052030 A1    2/2015    McCullough et al.
2015/0088702 A1    3/2015    Amigud et al.
2015/0347554 A1    12/2015    Vasantham et al.

OTHER PUBLICATIONS

International Search Report and Written Opinion issued in the international counterpart application No. PCT/US2017/020317, dated May 16, 2017, twelve pages.

* cited by examiner

|  | Order Quantity (X) |
|---|---|
| Product A | 10 |
| Product B | 5 |
| Product C | 12 |

FIG. 5

|  | Threshold Sales Per Unit Time | Threshold Number of Time Units | Threshold Inventory Quantity (Y) | Last Known Inventory Quantity (Z) | Sales Promotion Flag | Excluded Category Flag | Failed Asynchronous Reservation Flag |
|---|---|---|---|---|---|---|---|
| Product A | 5 | 4 | 20 | 100 | FALSE | FALSE | FALSE |
| Product B | 20 | 2 | 40 | 40 | FALSE | FALSE | FALSE |
| Product C | 50 | 3 | 150 | 250 | TRUE | FALSE | FALSE |

OPTIMISTIC PRODUCT ORDER RESERVATION SYSTEM AND METHOD

CROSS-REFERENCE TO RELATED APPLICATION

This application is related to the co-pending application entitled "Offline Product Order Reservation System and Method," Ser. No. 15/062,081, which is hereby incorporated by reference in its entirety.

FIELD OF THE DISCLOSURE

This disclosure is generally directed to the processing of orders for products received through network-based channels, including the confirmation of such orders.

BACKGROUND OF RELATED ART

A retailer may sell products and services through numerous sales channels, including in-store carry sales, website and mobile app sales, and in-store non-carry sales. In known systems for receiving and processing customer orders to a retailer for products through network-based channels (e.g., website and mobile app orders and in-store non-carry orders), those orders are generally processed according to one of two approaches. In one approach, each and every order is forwarded to a master inventory management system, which checks for available stock and confirms or denies that the ordered amount is available. Only after the inventory management system confirms that the stock is available is the order confirmed for the user. In another approach, each and every order is confirmed to the user without regard to actual available stock. After confirming the order for the user, the inventory management system is checked for available stock. If that stock is, in fact, not available, a cancellation of the order or other message is sent to the user.

SUMMARY

An embodiment of a system for evaluating product orders includes an inventory management system and an order management system configured to communicate with the inventory management system over a network. The order management system includes a data storage subsystem storing threshold inventory data and last known inventory data. The order management system further includes an order processing subsystem configured to receive a current inventory quantity of a product from the inventory management system, store the current inventory quantity as a last known inventory of the product in the last known inventory data, receive an order for an order quantity of the product from a user computing device, the order received over a network, retrieve a threshold inventory quantity of the product from the threshold inventory data, retrieve the last known inventory quantity of the product from the last known inventory data, and compare the threshold inventory quantity of the product with the difference between the last known inventory quantity and the order quantity. The order processing subsystem may be further configured to perform an asynchronous reservation of the quantity of the product when the threshold inventory quantity is less than the difference between the last known inventory quantity and the order quantity, wherein an asynchronous reservation comprises the order processing system confirming the order to the user without waiting for the inventory management system to confirm the order. The order processing subsystem may be further configured to perform a synchronous reservation of the quantity of the product when the threshold inventory quantity is greater than the difference between the last known inventory quantity and the order quantity, wherein a synchronous reservation comprises the order processing system confirming the order to the user only after the inventory management system confirms the order.

An embodiment of a method for evaluating product orders in a multi-channel, network-based system includes receiving, by a computerized order management system, a current inventory quantity of a product from a computerized inventory management system, storing, by the computerized order management system, the current inventory quantity as a last known inventory of the product in a store of last known inventory data, receiving, by the computerized order management system, an order for an order quantity of the product from a user computing device, the order received over a network, retrieving, by the computerized order management system, a threshold inventory quantity of the product from a store of threshold inventory data, retrieving, by the computerized order management system, the last known inventory quantity of the product from the last known inventory data, and comparing, by the computerized order management system, the threshold inventory quantity of the product with the difference between the last known inventory quantity and the order quantity. The method may further include performing, by the computerized order management system, an asynchronous reservation of the quantity of the product when the threshold inventory quantity is less than the difference between the last known inventory quantity and the order quantity, wherein an asynchronous reservation comprises the order processing system confirming the order to the user without waiting for the inventory management system to confirm the order. The method may further include performing, by the computerized order management system, a synchronous reservation of the quantity of the product when the threshold inventory quantity is greater than the difference between the last known inventory quantity and the order quantity, wherein a synchronous reservation comprises the order processing system confirming the order to the user only after the inventory management system confirms the order.

An embodiment of a system for evaluating product orders includes an inventory management system and an order management system configured to communicate with the computerized inventory management system over a network. The order management system includes a data storage subsystem storing threshold inventory data, last known inventory data, and product flag data. The order management system further includes an order processing subsystem configured to receive a current inventory quantity of a product from the inventory management system, store the current inventory quantity as a last known inventory of the product in the last known inventory data, receive an order for an order quantity of the product from a user computing device, the order received over a network, retrieve a threshold inventory quantity of the product from the threshold inventory data, retrieve the last known inventory quantity of the product from the last known inventory data, retrieve a status of a flag associated with the product from the flag status data, the flag having a synchronous state and an asynchronous state, and compare the threshold inventory quantity of the product with the difference between the last known inventory quantity and the order quantity. The order processing subsystem may be further configured to perform an asynchronous reservation of the quantity of the product when the flag is in an asynchronous state and the threshold inventory quantity is less than the difference between the last known inventory quantity and the order quantity, wherein an asynchronous reservation comprises the order processing system confirming the order to the user without waiting for the inventory management system to confirm the order. The order processing subsystem may be further configured to perform a synchronous reservation of the quantity of the product when the flag is in a synchronous state or the threshold inventory quantity is greater than the difference between the last known inventory quantity and the order quantity, wherein a synchronous reservation comprises the order processing system confirming the order to the user only after the inventory management system confirms the order.

DETAILED DESCRIPTION

The present disclosure includes systems and methods for receiving and processing user orders. Such orders may be for products or services from a retailer, wholesaler, or other source. The remainder of this disclosure will be made with reference to embodiments in which the user orders are for products sold by a single retailer, with the users being end customers or retail associates for brick-and-mortar locations of that retailer. Such disclosure is by way of example only.

The receiving and processing of user orders disclosed herein improves upon known methods and systems for receiving and processing user orders. The two general known methods for receiving and processing user orders both have drawbacks that can impact the user experience. The first method, checking for stock in the inventory management system for each and every order, may be undesirably slow. The second method, confirming every order regardless of stock, may result in a large number of false positive order confirmations, resulting in displeased customers who thought they had successful orders later finding out that their orders were unsuccessful. In contrast, methods and systems according to the present disclosure may reduce the amount of time between when a user places an order (e.g., clicks "submit" on an order interface) and when the user receives confirmation that the order was successful (e.g., on the order interface) without excessively confirming orders for which it is not known if sufficient inventory is available. Accordingly, the user order experience is improved through increased speed without an undue number of false positive order confirmations.

The problems with known order receiving and processing systems and methods are particular to computerized order placement. For many retailers, a large number of brick-and-mortar locations and increased use of website and mobile app orders by customers results in the retailer's inventory management system receiving large numbers of orders through many different channels. As a result, the inventory management system of the retailer handles large amounts of data, for potentially large numbers of products, and may be relatively slow. In addition, a retailer's inventory management system may be separate from the order management system that initially receives the orders and provides the interface and environment in which those orders are placed (e.g., the retailer's website, mobile app, and the in-store order interface). Accordingly, communication between the order management system and the inventory management system further delays order confirmation.

The systems and methods of the present disclosure provide a technology-based solution for improving the field of order and inventory management, thus improving the Internet-centric problem of improving response times to orders placed through a network-based interface, particularly orders placed through the network-based interface of a retailer by a customer or in a brick-and-mortar store. The system and methods of the present disclosure may also improve the functionality of the inventory management system by reducing the number and frequency of time-critical synchronous reservation calls to the inventory management system, thereby enabling the inventory management system to more effectively and freely balance its resources.

First, with respect to FIG. 1, a computing environment that may be used by a customer or retail associate will be described. Portions of the computing environment of FIG. 1 may also be deployed for an inventory management system and/or an order management system of the present disclosure. With respect to FIG. 2, an illustrative system for receiving and processing orders, including an inventory management system and an order management system, will be described. Finally, with respect to FIGS. 2-5, an illustrative method for receiving and processing user order will be described.

Reference will now be made in detail to the preferred embodiments of the invention, examples of which are illustrated in the accompanying drawings. FIG. 1 is a diagrammatic view of an illustrative computing system that includes a general purpose computing system environment 20, such as a desktop computer, laptop, smartphone, tablet, or any other such device having the ability to execute instructions, such as those stored within a non-transient, computer-readable medium. Furthermore, while described and illustrated in the context of a single computing system 20, those skilled in the art will also appreciate that the various tasks described hereinafter may be practiced in a distributed environment having multiple computing systems 20 linked via a local or wide-area network in which the executable instructions may be associated with and/or executed by one or more of multiple computing systems 20.

In its most basic configuration, computing system environment 20 typically includes at least one processing unit 22 and at least one memory 24, which may be linked via a bus 26. Depending on the exact configuration and type of computing system environment, memory 24 may be volatile (such as RAM 30), non-volatile (such as ROM 28, flash memory, etc.) or some combination of the two. Computing system environment 20 may have additional features and/or functionality. For example, computing system environment 20 may also include additional storage (removable and/or non-removable) including, but not limited to, magnetic or optical disks, tape drives and/or flash drives. Such additional memory devices may be made accessible to the computing system environment 20 by means of, for example, a hard disk drive interface 32, a magnetic disk drive interface 34, and/or an optical disk drive interface 36. As will be understood, these devices, which would be linked to the system bus 26, respectively, allow for reading from and writing to a hard disk 38, reading from or writing to a removable magnetic disk 40, and/or for reading from or writing to a removable optical disk 42, such as a CD/DVD ROM or other optical media. The drive interfaces and their associated computer-readable media allow for the nonvolatile storage of computer readable instructions, data structures, program modules and other data for the computing system environment 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 20.

A number of program modules may be stored in one or more of the memory/media devices. For example, a basic input/output system (BIOS) 44, containing the basic routines that help to transfer information between elements within the computing system environment 20, such as during start-up, may be stored in ROM 28. Similarly, RAM 30, hard drive 38, and/or peripheral memory devices may be used to store computer executable instructions comprising an operating system 46, one or more applications programs 48 (such as a Web browser, retailer's mobile app, and/or retailer's point-of-sale checkout and ordering program), other program modules 50, and/or program data 52. Still further, computer-executable instructions may be downloaded to the computing environment 20 as needed, for example, via a network connection.

An end-user, e.g., a customer, retail associate, and the like, may enter commands and information into the computing system environment 20 through input devices such as a keyboard 54 and/or a pointing device 56. While not illustrated, other input devices may include a microphone, a joystick, a game pad, a scanner, etc. These and other input devices would typically be connected to the processing unit 22 by means of a peripheral interface 58 which, in turn, would be coupled to bus 26. Input devices may be directly or indirectly connected to processor 22 via interfaces such as, for example, a parallel port, game port, firewire, or a universal serial bus (USB). To view information from the computing system environment 20, a monitor 60 or other type of display device may also be connected to bus 26 via an interface, such as via video adapter 62. In addition to the monitor 60, the computing system environment 20 may also include other peripheral output devices, not shown, such as speakers and printers.

The computing system environment 20 may also utilize logical connections to one or more computing system environments. Communications between the computing system environment 20 and the remote computing system environment may be exchanged via a further processing device, such a network router 72, that is responsible for network routing. Communications with the network router 72 may be performed via a network interface component 74. Thus, within such a networked environment, e.g., the Internet, World Wide Web, LAN, or other like type of wired or wireless network, it will be appreciated that program modules depicted relative to the computing system environment 20, or portions thereof, may be stored in the memory storage device(s) of the computing system environment 20.

Figure 2:
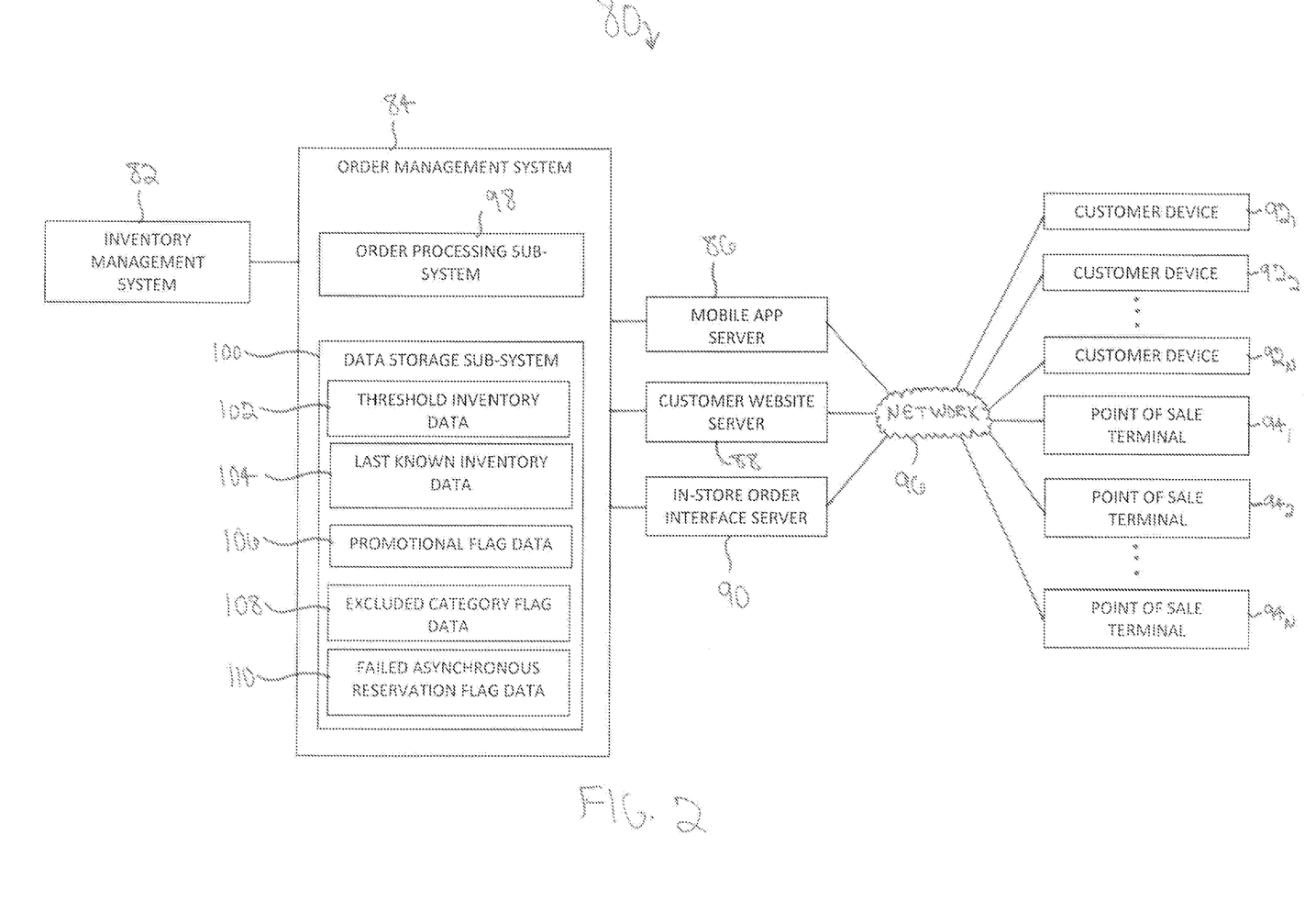
FIG. 2 is a block diagram view of an order placement and reservation system, according to some embodiments.

FIG. 2 is a block diagram view of an illustrative system 80 for order placement, reception, and processing. The system 80 includes an inventory management system 82, an order management system 84, a mobile app server 86, a customer website server 88, an in-store order interface server 90, a plurality of customer devices $92_1, 92_2, \ldots, 92_N$ (which may be referred to individually as customer device 92 or collectively as customer devices 92), and a plurality of point-of-sale terminals $94_1, 94_2, \ldots, 94_N$ (which may be referred to individually as point-of-sale terminal 94 or collectively as point-of-sale terminals 94).

Figure 1:
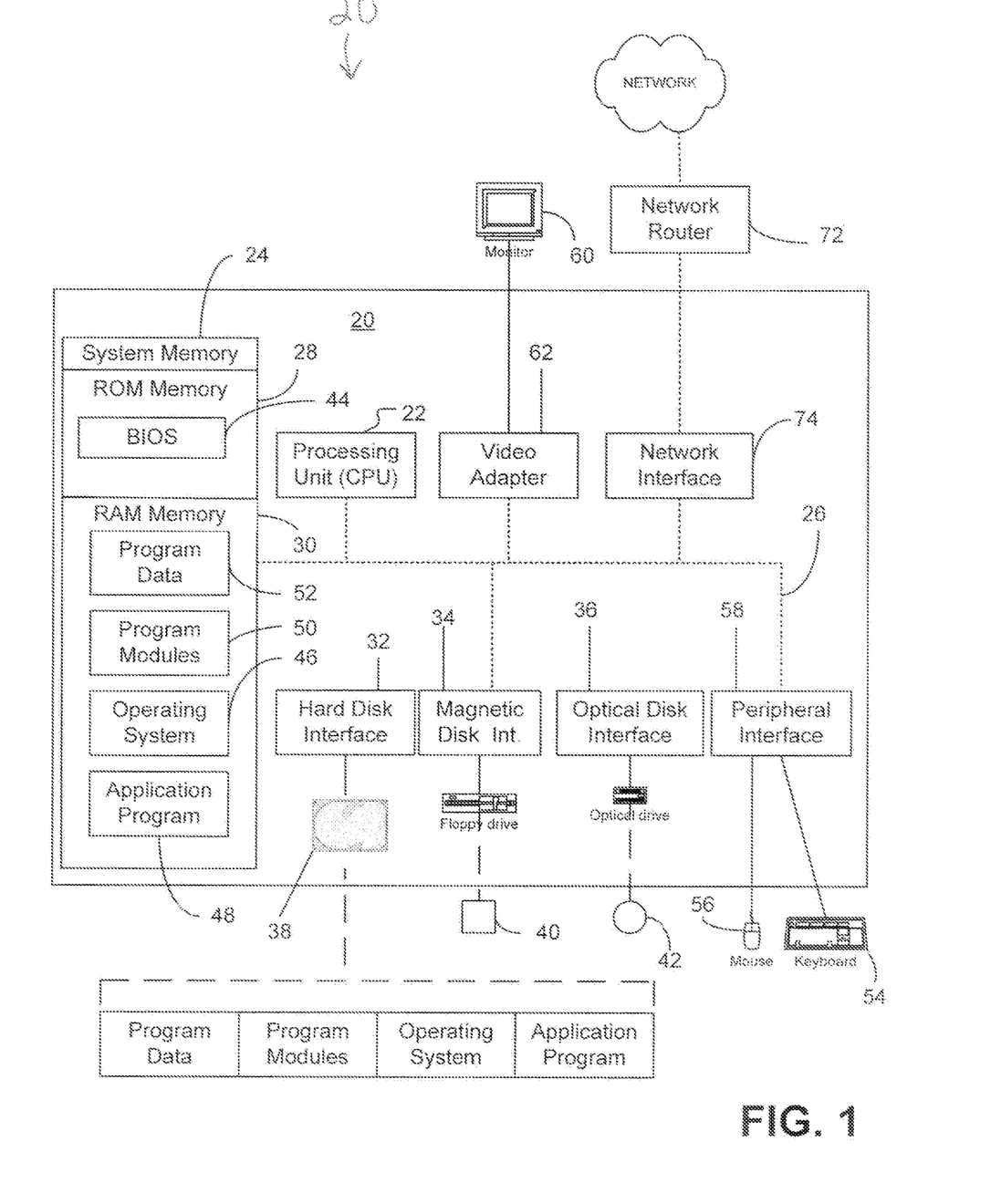
FIG. 1 is a diagrammatic view of a user computing environment, according to some embodiments.

The customer devices 92 and the point-of-sale terminals 94 are various embodiments of computing environments such as the computing environment 20 illustrated in and described with respect to FIG. 1. For example, the customer devices $92_1, 92_2, \ldots, 92_N$ may be personal computers, tablets, mobile phones, and the like, capable of placing orders through a website or application. The point-of-sale terminals $94_1, 94_2, \ldots, 94_N$ may be computing terminals in brick-and-mortar retail stores, in an embodiment. The point-of-sale terminals 94 may be used, for example, by a retail associate to place an order on behalf of a customer at the store for a product that is not in that particular store, does not have sufficient inventory in that store, etc. (sometimes referred to as a "non-carry" order), in addition to other known point-of-sale functions.

The mobile app server 86, the customer website server 88, and the in-store order interface server 90 are configured to be accessed by the customer devices 92 and/or point-of-sale terminals 94 over a network 96 (e.g., the Internet) and to provide interfaces through which orders for products may be placed on the customer devices 92 and point-of-sale terminals 94. For example, in an embodiment: the mobile app server 86 hosts and provides a mobile app interface and/or mobile website interface through which a user mobile device (e.g., mobile phone or tablet, which may be customer device $92_1$, in an embodiment) may place an order; the customer website server 88 hosts and provides a website interface through which a user personal computer (which may be customer device $92_2$, in an embodiment) may place an order; and the in-store order interface server 90 provides an interface through which point-of-sale terminals 94 may place orders on behalf of customers.

The servers 86, 88, 90 may provide the entirety of an interface, or may work in conjunction with an application or client stored and executing on a customer device 92 or point-of-sale terminal 94 to provide that interface. For example, in an embodiment, one or more of the servers 86, 88, 90 may cooperate and interact with a web browser, mobile app, point-of-sale checkout software, and/or other software to provide the full interface.

As part of providing the order interface, the servers 86, 88, 90 may cause order confirmations to appear in those interfaces, in an embodiment. The servers 86, 88, 90 may cause an order confirmation to appear in the interface responsive to instructions from the order management system 84 or responsive to a transmission of such an order confirmation from the order management system 84. Methods and techniques of the present disclosure may result in the faster average appearance of an accurate order confirmation for the user relative to known methods and techniques.

In various embodiments, the inventory management system 82 may manage the inventory of a retailer. The inventory management system 82 may be an inventory management module of a Sterling distributed order management system, commercially available from IBM, or other appropriate inventory management system. The inventory management system 82 stores the location of each and every item of stock of the retailer, including retail locations, warehouses, and the like, reserves items of stock to account for unfulfilled orders, initiates and instructs order fulfillment, and initiates and instructs supply replenishment, in an embodiment. As part of reserving items of stock and fulfilling orders, the inventory management system 82 may determine the specific source location (e.g., particular warehouse or store) for each item of stock that is reserved and shipped to fulfill every order, in an embodiment. As noted above, reserving items of stock to account for unfulfilled orders is particularly complex for a retailer having to process orders through a large number of brick-and-mortar locations as well as through a website and/or mobile app. The large number of orders, including potentially many orders for the same product at substantially the same time, coupled with the need for a very high degree of accuracy by the inventory management system, slows down the inventory management system's processing and may result in a sub-optimal user ordering experience. Accordingly, the order management system 84 may perform a number of functions to improve the user ordering experience.

The order management system 84 is generally configured to receive and process orders so as to improve the user ordering experience without falsely confirming an undue number of orders. The order management system 84 is configured, in an embodiment, to decide whether to perform an "asynchronous" reservation or a "synchronous" reservation for each order and/or for each product within an order.

For both an asynchronous reservation and a synchronous reservation, the order management system 84 determines whether the quantity of a product requested in an order, for each product in the order, is available for provision to the customer. An asynchronous reservation generally includes transmitting, by the order management system 84, a request to reserve the ordered quantity of the product to the inventory management system 82 and transmitting a confirmation of the order to the user computing device (e.g., a customer device 92 or point-of-sale terminal 94) without waiting for confirmation from the inventory management system 82 that the ordered quantity of the product was successfully reserved. Because an asynchronous reservation does not await confirmation from the inventory management system 82, it may also be referred to as an "optimistic" reservation due to the optimistic assumption or belief by the order management system 84 that the stock is available. On the other hand, a synchronous reservation generally includes transmitting, by the order management system 84, a request to reserve the ordered quantity of the product to the inventory management system 82, and transmitting, by the order management system 84, a confirmation of the order to the user computing device (e.g., customer device 92 or point-of-sale terminal 94) only after receiving confirmation from the inventory management system 82 that the ordered quantity was successfully reserved.

An asynchronous reservation generally requires less time between user order submission and order confirmation to the user than a synchronous reservation. As a result, the user order experience may be improved by the use of an asynchronous reservation, because the user receives faster confirmation of the order. Asynchronous reservations, however, carry a degree of risk. The inventory management system 82 is the ultimate keeper of the official inventory, in embodiments, so confirming an order before the inventory management system 82 confirms that the stock is available may result in a false positive confirmation. Accordingly, the order management system 84 may be configured to store certain data and perform certain calculations to perform asynchronous reservations under "safe" circumstances to reduce false positive order confirmations while increasing the average speed of the user ordering process.

The order management system 84 is a computerized environment that includes an order processing sub-system 98 and a data storage sub-system 100, in various embodiments. The order management system 84, or some or all components of the order management system 84, comprises some or all of the components of the computing environment 20 of FIG. 1, scaled for the operations disclosed herein, in an embodiment. The order management system 84 is configured for network-based communication with the inventory management system 82 and the servers 86, 88, 90, in an embodiment. In addition, the components of the order management system 84—i.e., the order processing sub-system 98 and the data storage sub-system 100—are configured for network-based communications with each other, in an embodiment.

The data storage sub-system 100 stores a number of categories of data useful for carrying out one or more methods for receiving and processing user orders, such as the methods of this disclosure. In an embodiment, the data storage sub-system 100 stores threshold inventory data 102, last known inventory data 104, promotional flag data 106, excluded category flag data 108, and failed asynchronous reservation flag data 110. The data storage sub-system 100 may be, for example, a no-SQL Apache database system, in an embodiment.

The representations of the flag data and the storage of that data illustrated and described in this disclosure are illustrative only, and changes may be made and remain within the spirit and scope of this disclosure. For example, although shown as separate data, the contents of two or more of the threshold inventory data 102, last known inventory data 104, promotional flag data 106, excluded category flag data 108, and failed asynchronous reservation flag data 110 may be stored in a single file, directory, database, etc.

The last known inventory data 104 includes a listing of the last known inventory (i.e., last known quantity in stock) for a plurality of products carried by the retailer, in an embodiment. For example, in an embodiment, the last known inventory data 104 stores the last known inventory for thousands, tens of thousands, or more different products.

The last known inventory data 104 is separate from the inventory management system 82, in an embodiment. The last known inventory data 104 may include significantly less information, and for a narrower purpose, than the inventory management system 82, and therefore may provide significantly faster access to the information stored. The "knowledge" stored in the last known inventory data 104 is from the point of view of the order management system 84, not the point of view of the inventory management system 82, in an embodiment. However, the last known inventory data 104 may be updated according to data obtained from the inventory management system 82, or in conjunction with data exchanged with the inventory management system 82, as will be set forth in further detail later in this disclosure.

The threshold inventory data 102 stores a respective threshold for a plurality of products carried by the retailer which the order management system 84 may use to determine how to process a user order for a given product (i.e., with a synchronous or asynchronous reservation). In an embodiment, the threshold for a given product is expressed (i.e., stored) in the threshold inventory data 102 in terms of a projected sales volume per unit time (for example, a projected number of units sold per week) and a selected number of time units. The projected sales volume and selected number of time units may be customized for each product, i.e., determined on a product-by-product basis. The unit of time may be days, weeks, months, or any appropriate unit of time, in an embodiment.

In an embodiment, the order management system 84 (e.g., the order processing sub-system 98) may be configured to calculate the threshold inventory quantity for a plurality of products according to a forecasted number of sales of each product for a unit of time and a selected number of units of time and to store the threshold inventory quantity for the product in the threshold inventory data. The order management system 84 may be configured for communication with one or more merchandising systems of the retailer to access such information, in an embodiment. The order management system 84 may be configured to automatically calculate or update the threshold inventory quantity for one or more products on a periodic basis, in an embodiment. For example, the order management system 84 may be configured to automatically calculate or update the threshold inventory quantity for one or more products to reflect season-specific demand for those products.

The promotional flag data 106 may store a respective binary flag (i.e., a flag having a first state and a second state) for a plurality of products carried by a retailer. The flag is indicative of whether or not any given product is associated with a sales promotion, in an embodiment. For example, if a first product is subject to a 40% off promotion for a week, the promotional flag for that product within the promotional flag data 106 may be set to its first state ("TRUE") for that week. When the product is not associated with a promotion, the promotional flag for that product within the promotional flag data 106 may be set to its second state ("FALSE"). In an embodiment, the order processing sub-system 98 may use the promotional flag for each product to prevent asynchronous reservations for products associated with promotions.

The excluded category flag data 108 may store a respective binary flag (i.e., a flag having a first state and a second state) for a plurality of products carried by the retailer. The excluded category flag for a product is indicative of whether or not that product is within a category of products that are excluded from asynchronous reservations, in an embodiment. In one example, product categories known to be purchased in high volumes may be excluded from asynchronous reservations. Holiday décor may be one such category. Accordingly, in one embodiment, a flag associated with Christmas lights, Christmas ornaments, holiday lawn decorations, Christmas tree decorations, and the like may all have an excluded category flag set to a first state (i.e., "TRUE"). Other products that are not within an excluded category may have an exclude category flag set to a second state (i.e., "FALSE").

The failed asynchronous reservation flag data 110 may store a respective binary flag (i.e., a flag having a first state and a second state) for a plurality of products carried by the retailer. The failed asynchronous reservation flag data 110 is indicative of whether or not a product has had a failed asynchronous reservation since the flag was last reset, in an embodiment. A failed asynchronous reservation occurs when the order management system 84 receives an order (e.g., from a customer device 92 or point-of-sale terminal 94), confirms the order before the available inventory is confirmed by the inventory management system 82 (e.g., according to the method of FIG. 3, which will be described in detail later in this disclosure), and later receives notification from the inventory management system 82 that the quantity of product ordered was, in fact, not available for reservation. Upon such notification, the failed asynchronous reservation flag for the product associated with the failed asynchronous reservation may be set to a first state (i.e., "TRUE"). The failed asynchronous reservation flag may otherwise be set to (i.e., may have a default of) a second state (i.e., "FALSE") for each product.

In an embodiment, each of the threshold inventory data 102, the last known inventory data 104, the promotional flag data 106, the excluded category flag data 108, and the failed asynchronous reservation flag data 110 may have entries for the same plurality of products. In other embodiments, the inventory threshold data 102, the last known inventory data 104, the promotional flag data 106, the excluded category flag data 108, and the failed asynchronous reservation flag data 110 may have entries for separate sets of products, or different subsets of the same product base. For example, the inventory threshold data 102 and the last known inventory data 104 may have entries for each and every product sold by the retailer for relevant orders (e.g., all products that may be ordered by customer devices 92 or in non-carry orders at point-of-sale terminals 94, for example), whereas the promotional flag data 106, the excluded category flag data 108, and the failed asynchronous reservation flag data 110 may include entries for only those products having flags that are set to TRUE, in an embodiment.

The order processing sub-system 98 is a computerized processing system that is configured to perform one or more tasks, steps, methods, etc. to facilitate the receipt and processing of orders received from customer devices 92 and point-of-sale terminals 94, in an embodiment. The order processing sub-system 98 comprises some or all of the components of the computing environment 20 of FIG. 1, scaled for the operations disclosed herein, in an embodiment.

Figure 3:
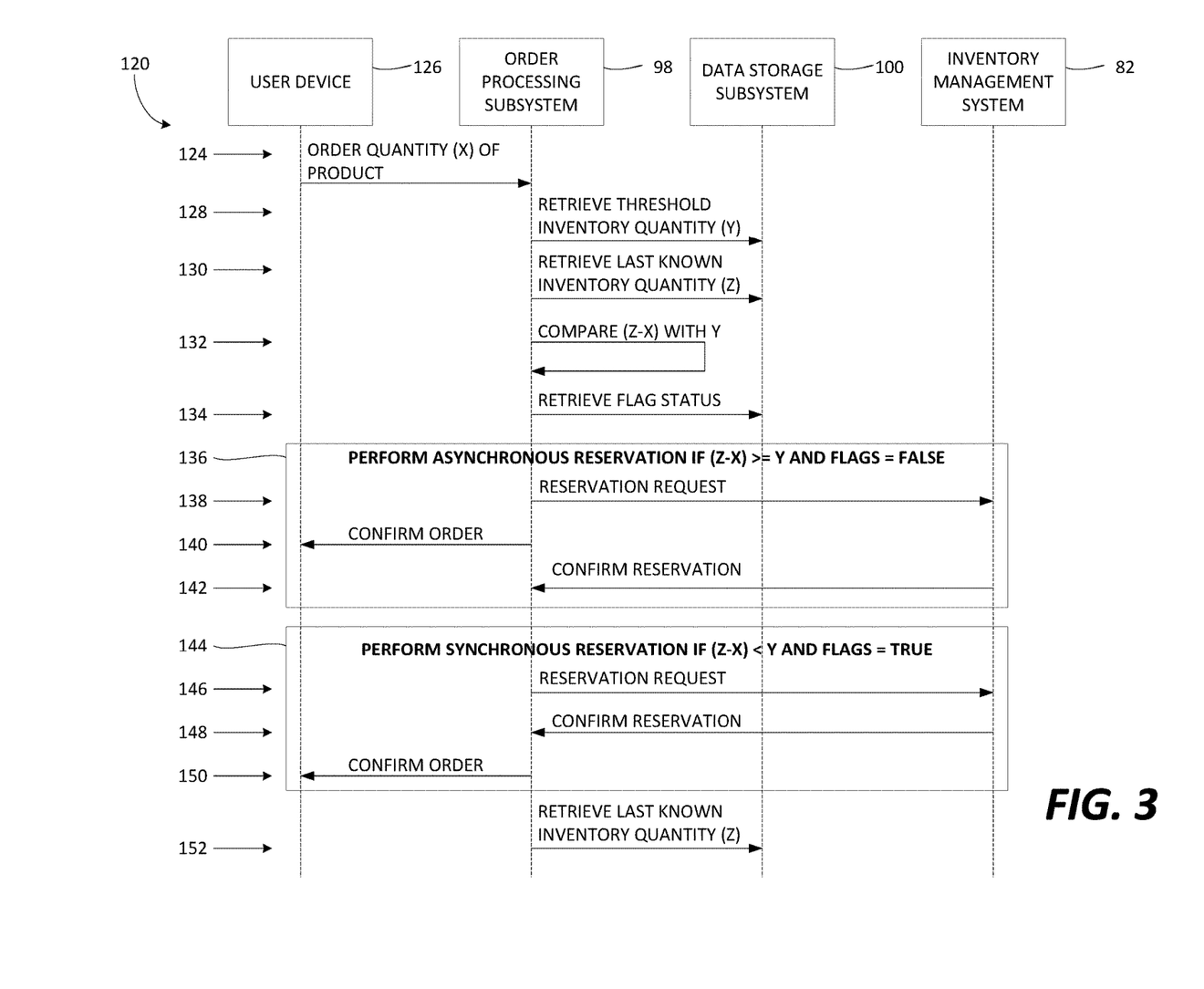
FIG. 3 is a sequence diagram illustrating a method of receiving and processing an order for a product, according to some embodiments.
Figure 4:
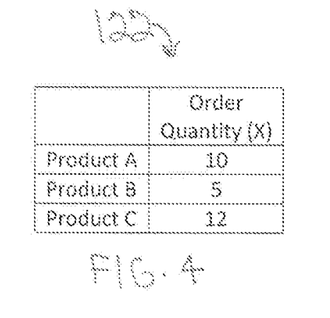
FIG. 4 is a table illustrating an order by a user for a plurality of products, according to some embodiments.
Figure 5:
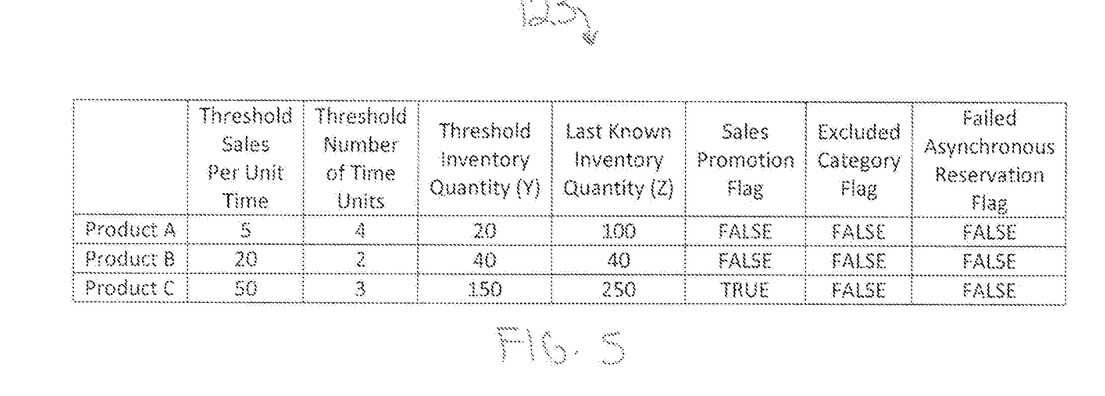
FIG. 5 is a table illustrating information that may be considered to determine how to process the order of FIG. 4 using the method of FIG. 3, according to some embodiments.

The order processing sub-system 98 may be configured to perform one or more methods for improving the user ordering experience in conjunction with the data storage sub-system 100 and the inventory management system 82, in an embodiment. FIG. 3 is a sequence diagram illustrating an illustrative embodiment of one such method 120. FIG. 4 is a table 122 including an illustrative order. FIG. 5 is a table 123 including data that may be considered in the method of FIG. 3 for processing the order of FIG. 4. The method 120 of FIG. 3 will now be described with reference to FIGS. 2-5. Many of the steps of the method 120 will be described as performed by the order processing sub-system 98. Accordingly, those steps may also be considered to be performed by the order management system 84.

FIG. 3 illustrates example steps utilized by various embodiments of the present technology and includes processes that, in various embodiments, are carried out by a processor under the control of computer-readable and computer-executable instructions. The computer-readable and computer-executable instructions may reside, for example, in non-transient data storage features, such as storage devices 38, 40 and 42 of FIG. 1. Although specific operations are disclosed in FIG. 3, such operations serve as examples. That is, embodiments are well suited to performing various other operations or variations of the operations recited in FIG. 3. It is appreciated that the operations shown in FIG. 3 may be performed in an order different than presented, and that not all of the operations in FIG. 3 may need to be performed. Where helpful for the purposes of illustration, and not for limitation, FIG. 3 will, as noted above, be described with reference to the other figures, which illustrate hypothetical situations in which embodiments may be implemented.

The illustrative method 120 includes step 124 in which the order processing sub-system 98 receives an order for an order quantity of a product from a user device 126, which may be a customer device 92 or a point-of-sale terminal 94, for example only. This order quantity is referred to as value "X" in FIGS. 3 and 4. The order is received by the order processing sub-system 98 from a user device 126, in an embodiment, through an interface provided by one of the servers 86, 88, 90, though the servers are not illustrated in FIG. 3. Further steps in the method 120 that involve communication between the order processing sub-system 98 and the user device 126 may also be through one of the servers 86, 88, 90. Order submission by a user may result from, for example, a user clicking "submit" in an order interface. Referring to FIG. 4, in an illustrative order, the user may order ten (10) units of Product A, five (5) units of Product B, and twelve (12) units of Product C.

The illustrative method 120 may further include step 128 in which the order processing sub-system 98 retrieves a threshold inventory quantity of the product from the threshold inventory data 102 in the data storage sub-system 100. The threshold inventory quantity is referred to as value "Y" in FIGS. 3 and 5. The order processing sub-system 98 retrieves a sales volume (i.e., number of units of the product) per time unit and a number of time units associated with each of the products in the order (i.e., Product A, Product B, and Product C), in an embodiment. The order processing sub-system 98 may multiply those two values to calculate an inventory threshold for each product. Alternatively, in another embodiment, the inventory threshold data 102 stores a single value for the inventory threshold for each product, and the order processing sub-system 98 retrieves that single value. For the illustrative data of FIG. 5, the order processing sub-system 98 retrieves respective threshold inventory quantities (Y) of 20, 40, and 150 for Products A, B, and C.

The illustrative method 120 may further include step 130 in which the order processing sub-system 98 retrieves a last known inventory quantity of the product from the last known inventory data 104 in the data storage sub-system 100. The last known inventory quantity is referred to as value "Z" in FIGS. 3 and 5. The order processing sub-system 98 retrieves a last known inventory quantity associated with each product in the order (i.e., each of Product A, Product B, and Product C). In the illustrative data of FIG. 5, the order processing sub-system 98 retrieves last known inventory quantity (Z) values of 100, 40, and 250 for Products A, B, and C, respectively.

The illustrative method 120 may further include step 132 in which the order processing sub-system 98 compares the threshold inventory quantity (Y) with the difference between the last known inventory quantity (Z) and the order quantity (X). For example, the order processing sub-system 98 subtracts the order quantity for each product from the last known inventory quantity for that product (i.e., computes Z−X), and compares that result with the threshold inventory quantity (Y) for that product, in an embodiment. For the example order in FIG. 4, the order management system compares (100−10=90) with (20) for Product A, (40−5=35) with (40) for Product B, and (250−12=238) with (150) for Product C. The outcome of that comparison—i.e., whether the difference between the last known inventory and the order quantity is greater or less than the threshold inventory quantity—informs how the order processing sub-system 98 processes the order (i.e., synchronously or asynchronously), in an embodiment.

The illustrative method 120 may further include step 134 in which the order processing sub-system 98 retrieves the status of one or more flags associated with the product from a store of flag status data (which may include, for example only, one or more of the promotional flag data 106, the excluded category flag data 108, and/or the failed asynchronous reservation flag data 110, for example). For the illustrative order of FIG. 4, the order processing sub-system 98 may retrieve a promotional flag status, an excluded product flag status, and a failed asynchronous reservation flag status for each of Products A, B, and C. In the illustrated example, each of these flags is set to FALSE except for the sales promotion flag associated with Product C. Each flag may be considered to have a synchronous state ("TRUE") in which a synchronous reservation will be required, and an asynchronous state ("FALSE") in which an asynchronous reservation will be allowed.

The illustrative method 120 may further include step 136 in which the order processing sub-system 98, in conjunction with the inventory management system 82, performs an asynchronous reservation of the quantity of the product if the threshold inventory quantity is less than or equal to the difference between the last known inventory quantity and the order quantity (i.e., when Y<=(Z−X)). For the illustrative order of FIG. 4, Products A and C qualify for an asynchronous reservation based on this comparison (because, for each, Y<=(Z−X)), but Product B does not (because, for Product B, Y>(Z−X)). In an alternative embodiment of the asynchronous reservation step 136, flags may be considered, so that the order processing sub-system 98 performs an asynchronous reservation for a product if the threshold inventory quantity is less than or equal to the difference between the last known inventory quantity and the order quantity for that product and each flag retrieved is in an asynchronous state. For the illustrative order of FIG. 4, with flags considered, Product A qualifies for an asynchronous reservation because, for Product A, (Z−X)>Y and n all flags are set to FALSE, i.e., their asynchronous state. In contrast, with flags considered, Products B does not qualify for an asynchronous reservation because, for Product B, (Z−X)<Y. Product C also does not qualify for an asynchronous reservation because the promotional flag associated with Product C is set to TRUE, i.e., its synchronous state.

An asynchronous reservation 136 may include several steps, in an embodiment. For example, as illustrated in FIG. 3, an embodiment of an asynchronous reservation may include step 138 in which the order processing sub-system 98 transmits a request to reserve the order quantity of the product to the inventory management system 82 and step 140 in which the order processing sub-system transmits a confirmation of the order to the user device 126 without waiting for confirmation from the inventory management system 82 that the order quantity of the product was successfully reserved. Later, the asynchronous reservation 136 may include step 142 in which the order processing sub-system 98 receives confirmation that the reservation was successful from the inventory management system 82.

The illustrative method 120 may further include step 144 in which the order processing sub-system 98, in conjunction with the inventory management system 82, performs a synchronous reservation of the quantity of the product if the threshold inventory quantity is greater than the difference between the last known inventory quantity and the order quantity. For the illustrative order of FIG. 4, Product B qualifies for a synchronous reservation based on this comparison. In an alternative embodiment of the synchronous reservation step 144, flags may be considered, so that the order processing sub-system performs a synchronous reservation for a product if the threshold inventory quantity is greater than the difference between the last known inventory quantity and the order quantity for that product or if any flag retrieved is in a synchronous state. For the illustrative order of FIG. 4, with flags considered, Products B and C qualify for a synchronous reservation. Product B qualifies for a synchronous reservation because, for Product B, (Z–X)<Y. Product C qualifies for a synchronous reservation because the promotional flag associated with Product C is set to TRUE, i.e., its synchronous state.

A synchronous reservation 144 may include several steps, in an embodiment. For example, as illustrated in FIG. 3, an embodiment of a synchronous reservation 144 may include step 146 in which the order processing sub-system 98 transmits a request to reserve the order quantity of the product to the inventory management system 82 and waits for confirmation from the inventory management system 82 that the order quantity of the product was successfully reserved. Once the order processing sub-system receives confirmation that the reservation was successful from the inventory management system at step 148, the order processing sub-system may then transmit a confirmation of the order to the user device at step 150.

In an embodiment, all products in a single order will be reserved asynchronously or synchronously. For example, in such an embodiment, if any single product in the order requires a synchronous reservation, then the entire order will be made under a synchronous reservation, whereas if all products in the order qualify for an asynchronous reservation, the entire order will be confirmed asynchronously. In such an embodiment, the entire order of FIG. 4 would be reserved synchronously. Alternatively, asynchronous and synchronous reservations may be performed on an item-by-item basis, in an embodiment. Where asynchronous and synchronous reservations are performed on an item-by-item basis, the order management system may send a single order confirmation for the entire order after confirmation of each item, with each item being processed through an iteration of the method 120, in an embodiment.

Although the above methodology assigns an asynchronous reservation to a situation in which the threshold inventory quantity is equal to the difference between the last known inventory quantity and the order quantity, a person of skill in the art will appreciate that such equivalence may instead lead to a synchronous reservation, in an embodiment.

The illustrative method 120 may further include step 152 in which the order processing sub-system 98 updates the last known inventory quantity for the product (e.g., each product in the order) in the last known inventory data 104 after receiving confirmation from the inventory management system 82 that the order quantity of the product was successfully reserved. For example, in an embodiment, the confirmation from the inventory management system 82 that the reservation was successful may include an updated inventory quantity for each ordered product. Accordingly, the order processing sub-system 98 receives that updated inventory quantity and stores the updated inventory quantity in the last known inventory data 104. The updated last known inventory quantity may be different from a simple subtraction of the ordered quantity from the previous value of the last known quantity, because the inventory management system 82 may have received other orders for the same product or received additional stock since the last update to the last known quantity for the product. Step 152 may also be considered the first step in a further iteration of the method 120, in an embodiment. That is, in an embodiment of the method 120, the order processing sub-system 98 receives that updated inventory quantity and stores the updated inventory quantity in the last known inventory data 104 before other steps illustrated and/or described in this disclosure.

It is possible that an asynchronous reservation may be performed for a quantity of a product that is not actually available. This may happen, for example, if the actual supply of a product is reduced significantly in the time since the last update to the last known inventory of that product such that the "last known inventory" entry for that product in the last known inventory data 104 becomes inaccurate. For example, this may happen if numerous high-volume orders for the same product are received within a very brief time window, if a supplier of a product ships less product than expected, etc. The last known inventory data 104 may also become inaccurate for one or more products due to communication issues between the order management system and the inventory management system, or due to a technical error in the data storage subsystem. If an asynchronous reservation is performed for a quantity of a product that is not actually available, after performing an asynchronous reservation of the order quantity of the product, the order processing sub-system 98 may receive a notification from the inventory management system 82 that the order quantity of the product could not be reserved. The order processing sub-system 98 may then set the failed asynchronous order flag associated with the product in the failed asynchronous order flag data 110 to TRUE to prevent the order processing sub-system 98 from performing further asynchronous reservations for future orders of the product. The sequence of events may be later reviewed to determine the cause of the failed asynchronous reservation, and the flag may be reset to FALSE when appropriate. Such review and reset may be performed by a human operator, or may be performed automatically by the order management system or other system.

Other flags, such as the promotional flag and excluded product category flag, for example, may be manually set by a human operator, in an embodiment. In another embodiment, the promotions flag, excluded product category flag, or another flag may be set by the order management system 84 automatically responsive to data stored in an external merchandising system of the retailer or responsive to other data.

In an embodiment of the method 120, an asynchronous reservation may be performed whenever possible. That is, an asynchronous reservation may be preferred over a synchronous reservation, where an asynchronous reservation will be performed if the order qualifies, but a synchronous reservation will be performed if the safety of a synchronous reservation is required.

The method 120 may be performed for a plurality of orders, with a separate iteration of the method 120 applied to each of the plurality of orders, in an embodiment. The various iterations of the method 120 may occur simultaneously, with the different iterations potentially at different stages of execution of the method 120, in an embodiment. Alternatively, the various iterations of the method may occur sequentially, with one iteration finishing before another begins.

Receiving and processing orders according to the methodology of this disclosure may significantly improve order processing speed relative to known methods without creating an undue number of false positive order confirmations. Each asynchronous order confirmation takes less time that a synchronous confirmation would have for the same order, in an embodiment. Thus, maximizing the number of asynchronous order confirmations maximizes the average order confirmation speed. Tracking and accounting for the last known inventory of products, along with maintaining threshold inventory levels and flags for those products so as to perform synchronous reservations when needed, reduces the likelihood that an asynchronous reservation will be performed without available stock. Accordingly, systems and methods according to the present disclosure may strike an appropriate balance between average order processing speed and minimized false order confirmations.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A system for evaluating product orders, the system comprising:

an inventory management system; and an order management system configured to communicate with the computerized inventory management system over a network, the order management system comprising:

a data storage subsystem storing threshold inventory data and last known inventory data;

an order processing subsystem configured to:

receive respective current inventory quantities of a first product and a second product from the inventory management system;

store the current inventory quantity of the first product as a last known inventory of the first product in the last known inventory data;

store the current inventory quantity of the second product as a last known inventory of the second product in the last known inventory data;

receive a first order for a first order quantity of the first product from a first user computing device, the first order received over a network;

retrieve a threshold inventory quantity of the first product from the threshold inventory data;

retrieve the last known inventory quantity of the first product from the last known inventory data;

compare the threshold inventory quantity of the first product with the difference between the last known inventory quantity of the first product and the first order quantity;

determine that the threshold inventory quantity of the first product is less than the difference between the last known inventory quantity of the first product and the first order quantity and, in response, perform an asynchronous reservation of the first order quantity of the first product, wherein the asynchronous reservation comprises the order processing system confirming the first order to the first user without waiting for the inventory management system to confirm the first order;

receive a second order for a second order quantity of the second product from a second user computing device, the second order received over a network;

retrieve a threshold inventory quantity of the second product from the threshold inventory data;

retrieve the last known inventory quantity of the second product from the last known inventory data;

compare the threshold inventory quantity of the second product with the difference between the last known inventory quantity of the second product and the second order quantity; and determine that the threshold inventory quantity of the second product is greater than the difference between the last known inventory quantity of the second product and the second order quantity and, in response, perform a synchronous reservation of the second quantity of the second product, wherein the synchronous reservation comprises the order processing system confirming the second order to the second user only after the inventory management system confirms the order.

2. The system of claim 1, wherein:
the asynchronous reservation comprises:
transmitting, by the computerized order management system, a request to reserve the first order quantity of the first product to the inventory management system; and
transmitting, by the computerized order management system, a confirmation of the first order to the first user computing device without waiting for confirmation from the inventory management system that the order quantity of the product was successfully reserved; and
the synchronous reservation comprises:
transmitting, by the computerized order management system, a request to reserve the second order quantity of the second product to the inventory management system; and
transmitting, by the computerized order management system, a confirmation of the second order to the second user computing device only after receiving confirmation from the inventory management system that the second order quantity of the second product was successfully reserved.

3. The system of claim 2, further comprising a server in communication with the order management system, the server configured to:
provide an order interface through which the first user places the first order; and
in response to the order management system transmitting a confirmation of the first order, cause the confirmation of the first order to appear in the order interface.

4. The system of claim 2, wherein the order processing subsystem is further configured to update the last known inventory quantity for the first product in the last known inventory data after receiving confirmation from the inventory management system that the first order quantity of the first product was successfully reserved.

5. The system of claim 1, wherein the data storage subsystem further stores product flag data and the order processing subsystem is further configured to:
after performing an asynchronous reservation of the first order quantity of the first product, receive a notification from the inventory management system that the first order quantity of the first product could not be reserved; and
set a flag associated with the first product in the product flag data to prevent the computerized order management system from performing an asynchronous reservation for a future order of the first product.

6. The system of claim 1, wherein the order processing sub-system is configured to:
calculate the threshold inventory quantity for the first product according to a forecasted number of sales of the first product for a unit of time and a selected number of units of time; and
store the threshold inventory quantity for the first product in the threshold inventory data.

7. The system of claim 1, wherein the first product is one of a plurality of products having respective inventories managed by the inventory management system and the first user computing device is one of a plurality of user computing devices connected to the order management system through the network.

8. A method for evaluating product orders in a multi-channel, network-based system, the method comprising:

receiving, by a computerized order management system, respective current inventory quantities of a first product and a second product from a computerized inventory management system;

storing, by the computerized order management system, the current inventory quantity of the first product as a last known inventory of the first product in a store of last known inventory data;

storing, by the computerized order management system, the current inventory quantity of the second product as a last known inventory of the second product in the store of last known inventory data;

receiving, by the computerized order management system, a first order for a first order quantity of the first product from a user computing device, the first order received over a network;

retrieving, by the computerized order management system, a threshold inventory quantity of the first product from a store of threshold inventory data;

retrieving, by the computerized order management system, the last known inventory quantity of the first product from the last known inventory data;

comparing, by the computerized order management system, the threshold inventory quantity of the first product with the difference between the last known inventory quantity of the first product and the first order quantity;

determining that the threshold inventory quantity of the first product is less than the difference between the last known inventory quantity of the first product and the first order quantity and, in response, performing, by the computerized order management system, an asynchronous reservation of the first quantity of the first product, wherein the asynchronous reservation comprises the order processing system confirming the first order to the first user without waiting for the inventory management system to confirm the first order;

receiving, by the computerized order management system, a second order for a second order quantity of the second product from a second user computing device, the second order received over a network;

retrieving, by the computerized order management system, a threshold inventory quantity of the second product from the store of threshold inventory data;

retrieving, by the computerized order management system, the last known inventory quantity of the second product from the last known inventory data;

comparing, by the computerized order management system, the threshold inventory quantity of the second product with the difference between the last known inventory quantity of the second product and the second order quantity; and determining that the threshold inventory quantity of the second product is greater than the difference between the last known inventory quantity of the second product and the second order quantity and, in response, performing, by the computerized order management system, a synchronous reservation of the second quantity of the second product, wherein the synchronous reservation comprises the order processing system confirming the second order to the second user only after the inventory management system confirms the second order.

9. The method of claim 8, wherein:
the asynchronous reservation comprises:
- transmitting, by the computerized order management system, a request to reserve the first order quantity of the first product to the inventory management system; and
- transmitting, by the computerized order management system, a confirmation of the first order to the first user computing device without waiting for confirmation from the inventory management system that the first order quantity of the first product was successfully reserved; and the synchronous reservation comprises:
- transmitting, by the computerized order management system, a request to reserve the second order quantity of the second product to the inventory management system; and
- transmitting, by the computerized order management system, a confirmation of the second order to the second user computing device only after receiving confirmation from the inventory management system that the second order quantity of the second product was successfully reserved.

10. The method of claim 9, further comprising:
providing, with a server in communication with the order management system, an order interface through which the first user places the first order;
wherein transmitting a confirmation of the first order causes the confirmation of the first order to appear in the order interface.

11. The method of claim 9, further comprising updating the last known inventory quantity for the first product in the last known inventory data after receiving confirmation from the inventory management system that the first order quantity of the first product was successfully reserved.

12. The method of claim 8, further comprising:
after performing the asynchronous reservation of the first order quantity of the first product, receiving, by the computerized order management system, a notification from the inventory management system that the first order quantity of the first product could not be reserved; and
setting a flag associated with the first product in product flag data to prevent the computerized order management system from performing an asynchronous reservation for a future order of the first product.

13. The method of claim 8, further comprising:
calculating the threshold inventory quantity for the first product according to a forecasted number of sales of the first product for a unit of time and a selected number of units of time; and
storing the threshold inventory quantity for the first product in the threshold inventory data.

14. The method of claim 8, wherein the first product is one of a plurality of products having respective inventories managed by the inventory management system and the first user computing device is one of a plurality of user computing devices connected to the order management system through the network.

15. A system for evaluating product orders, the system comprising:
an inventory management system; and
an order management system configured to communicate with the computerized inventory management system over a network, the order management system comprising:

a data storage subsystem storing threshold inventory data, last known inventory data, and product flag data;
an order processing subsystem configured to:
- receive a current inventory quantity of a first product from the inventory management system;
- store the current inventory quantity of the first product as a last known inventory of the first product in the last known inventory data;
- receive a first order for a first order quantity of the first product from a first user computing device, the first order received over a network;
- retrieve a threshold inventory quantity of the first product from the threshold inventory data;
- retrieve the last known inventory quantity of the first product from the last known inventory data;
- retrieve a status of a first flag associated with the first product from the flag status data, the first flag having a synchronous state and an asynchronous state;
- compare the threshold inventory quantity of the first product with the difference between the last known inventory quantity of the first product and the first order quantity;
- determine that the first flag is in an asynchronous state and the threshold inventory quantity of the first product is less than the difference between the last known inventory quantity of the first product and the first order quantity and, in response, perform an asynchronous reservation of the quantity of the product, wherein the asynchronous reservation comprises the order processing system confirming the order to the user without waiting for the inventory management system to confirm the order; and
- receive a second order for a second order quantity of a second product from a second user computing device, the second order received over a network;
- retrieve a status of a second flag associated with the second product from the flag status data, the second flag having a synchronous state and an asynchronous state; and
- determine that the second flag is in a synchronous state and, in response, perform a synchronous reservation of the second quantity of the second product, wherein the synchronous reservation comprises the order processing system confirming the second order to the second user only after the inventory management system confirms the second order.

16. The system of claim 15, wherein:
the asynchronous reservation comprises:
- transmitting, by the computerized order management system, a request to reserve the first order quantity of the first product to the inventory management system; and
- transmitting, by the computerized order management system, a confirmation of the first order to the first user computing device without waiting for confirmation from the inventory management system that the first order quantity of the first product was successfully reserved; and the synchronous reservation comprises:
- transmitting, by the computerized order management system, a request to reserve the second order quantity of the second product to the inventory management system; and transmitting, by the computerized order management system, a confirmation of the second order to the second user computing device only after receiving confirmation from the inventory management system that the second order quantity of the second product was successfully reserved.

17. The system of claim 16, further comprising a server in communication with the order management system, the server configured to:
provide an order interface through which the first user places the first order; and
in response to the order management system transmitting a confirmation of the first order, cause the confirmation of the first order to appear in the order interface.

18. The system of claim 15, wherein the first flag is a failed reservation flag, wherein the order management system is further configured to:
after performing an asynchronous reservation of the first order quantity of the first product, receive a notification from the inventory management system that the first order quantity of the first product could not be reserved; and
set the failed reservation flag to an asynchronous state.

19. The system of claim 15, wherein:
the second flag is a promotional flag, the synchronous state of the promotional flag indicating that the product is associated with a sales promotion, the asynchronous state of the promotional flag indicating that the product is not associated with a sales promotion; or
the second flag is an exclusion flag, the synchronous state of the exclusion flag indicating that the product is within a category of products excluded from asynchronous reservations, the asynchronous state of the exclusion flag indicating that the product is not within a category of products excluded from asynchronous reservations.

20. The system of claim 15, wherein the first product is one of a plurality of products having respective inventories managed by the inventory management system and the first user computing device is one of a plurality of user computing devices connected to the order management system through the network.

* * * * *